Patented Aug. 7, 1934

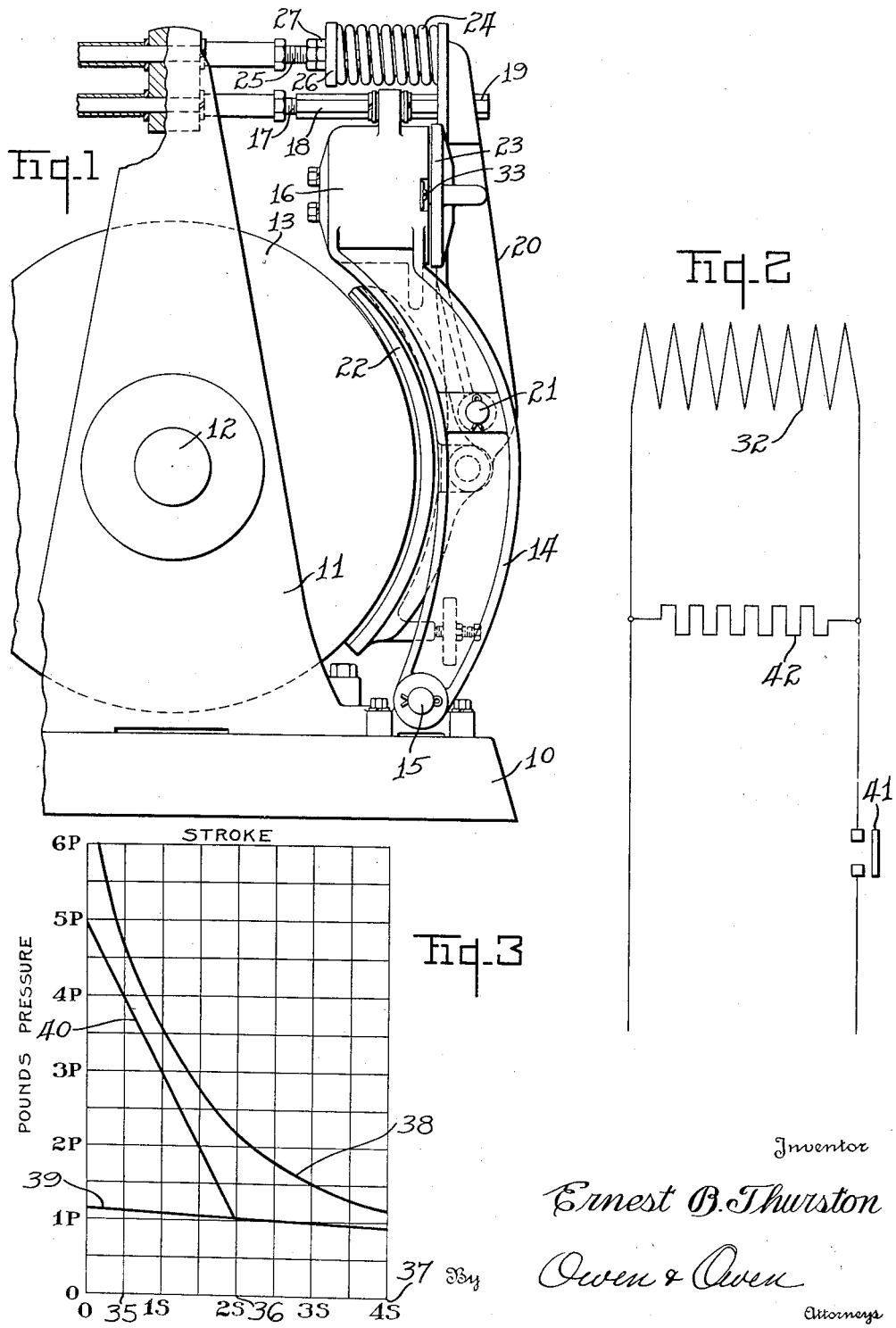

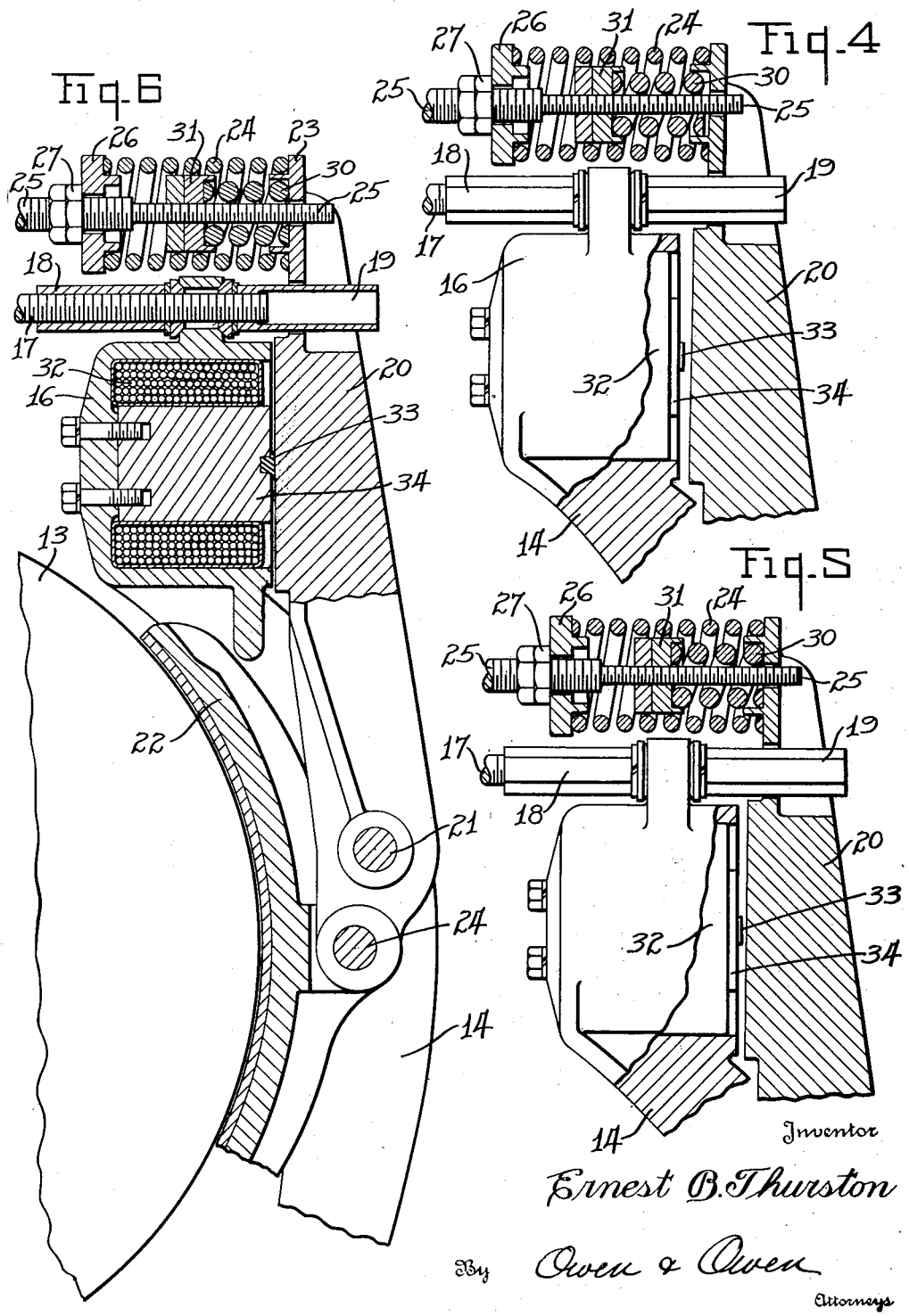

1,969,435

UNITED STATES PATENT OFFICE 1,969,435

ELECTROMAGNETICALLY CONTROLLED BRAKE

Ernest B. Thurston, Toledo, Ohio, assignor to The Haughton Elevator & Machine Company, Toledo, Ohio, a corporation of Ohio Application March 14, 1934, Serial No. 715,528

6 Claims. (Cl. 188—171)

This invention relates to an improvement in electro-magnets, and more particularly in the control and operation of a direct current electro-magnet having an armature normally pressed away from the magnet by a substantially constant force, such as a spring.

In a combination of the kind to which this invention relates, the armature is drawn to the magnet with rapidly increasing force as the distance between them diminishes, and conversely the attraction rapidly lessens as they separate. As a result, when the magnet is energized sufficiently to start the armature from its most distant position, it continues the movement of the armature with increasing force until the inner limit of the movement of the armature is suddenly reached; and when the magnet is de-energized to a point where the spring can start the armature away, the attraction decreases to practically nothing as the armature recedes, so that the spring slams the armature outward with a snap action.

This invention relates to the introduction of a supplementary spring or equivalent device to counterbalance the increasing attraction of the magnet as the armature approaches it, and to move the armature away from the magnet gradually as the magnetism dies.

The invention is particularly applicable to the operation of brakes for elevators or the like, and will be described in connection with its application to such a brake.

In the accompanying drawings forming part of this specification, Fig. 1 is a view of a brake and its operating devices; Fig. 2 is a diagram of the wiring of the magnet; Fig. 3 is a chart indicating a typical relation of the forces involved; Fig. 4 is a sectional view of the magnet, armature and controlling springs, with the brake set; Fig. 5 is a view similar to Fig. 4, but showing the parts when the brake is at an intermediate position; and Fig. 6 is a view similar to Fig. 4, but showing the parts when the brake is released.

The drawings show one application of the invention to a brake for an elevator such as shown in the patent to Ohler, No. 1,860,394, May 31, 1932. In this construction a base 10 has mounted thereon a bracket 11 in which is journalled a shaft 12 carrying a brake drum 13 of an elevator. An arm 14 pivotally mounted at 15 on the base carries at its upper end an electro-magnet 16 and is normally held in adjusted relation to the brake drum by a rod 17 and nuts 18 and 19.

A lever 20 pivoted at 21 to arm 14 carries on its lower end a brake shoe 22 and on its upper end an armature 23 for electro-magnet 16. The upper end of lever 20 is constantly pressed outward in brake applying direction by a spring 24 held in adjusted position on rod 25 by washer 26 and nut 27. Rods 17 and 25 are adjustably mounted in the upper end of bracket 11.

The arrangement thus far described is like that in the cited patent. The present invention is embodied in the addition of a spring 30 or its equivalent. This spring is located within spring 24, and is much shorter and stiffer.

Preferably spring 30 is adjusted by nut 31 on rod 25 so that it is fully expanded and does not press upon lever 20 when the brake is fully applied, as shown in Fig. 4, but so that lever 20 contacts and begins to compress it while the brake is still lightly applied as shown in Fig. 5. When coil 32 of magnet 16 has drawn armature 23 against the plate 33 of non-magnetic material interposed between it and the core 34 of the magnet, as shown in Fig. 6, spring 30 is compressed sufficiently to exert much more force than spring 24.

The brake shoe is preferably fitted very accurately, so that it is fully released or applied by a short movement of the upper end of lever 20, and no attempt has been made to show this movement drawn to scale in Figs. 4, 5 and 6, and therefore those figures should be considered diagrammatic.

In the chart shown in Fig. 3, the base line represents the position of the armature with respect to the magnet, the line 35 indicating the extreme inner position of the armature, as shown in Fig. 6, line 36 indicating an intermediate position such as shown in Fig. 5, while line 37 indicates the outer position of the armature with the brake fully applied, as shown in Fig. 4. The vertical graduations indicate force operating on the armature. Each graduation may be taken to indicate 500 lbs. of force.

Line 38 indicates the force with which the fully energized magnet attracts the armature at its different positions, and in the example given this is approximately 1200 lbs. at the outer position of the armature, line 37, approximately 2200 lbs. at line 36, the intermediate position, and approximately 4700 lbs. at line 35, the inner position of the armature.

Line 39 indicates the outward pressure of spring 24. Because of the comparatively great length of spring 24 in comparison with the length of travel of the upper end of lever 20, there is not a great deal of variation in its outward pressure at the different positions of the armature. In the example given, it varies from about 900 lbs. at the outer position to 1100 or 1200 lbs. at the inner position. This is greater than the usual compression of the corresponding spring in the usual brake of the Ohler patent type, for reasons that will be explained later, but the rate of variation of the force of the spring is approximately that usually found in such a brake.

Line 40 indicates the outward pressure exerted by the combination of springs 24 and 30. As previously indicated, spring 30 is out of action when the brake is fully applied, and is not picked up until the brake is nearly released, as indicated at line 36. Due to the relative short length and great strength of spring 30, its resistance increases rapidly after it is picked up, so that the combined outward pressure of the two springs reaches about 4000 lbs. when the armature reaches its inner limit at line 35.

It will be readily understood from the diagram that the release of the brake, in the absence of spring 30, is accompanied by a rapid increase in the difference between the outward pressure of spring 24 and the attraction of the magnet, this difference being only 200 or 300 lbs. at line 37, while it is some 3500 lbs. at line 35, in the example shown in the diagram. Obviously this results in a heavy thud of the armature against its inner limit. When spring 30 is added, the brake is released in substantially the same manner, except that spring 30 cushions the inner end of the stroke of the armature, so as to practically eliminate the brake-releasing thud.

In the operation of the device without spring 30, the armature remains in its inner position after current is switched off of the magnet until the residual magnetism decreases to about one-fourth of its full strength. When the armature starts to move, the attraction of the magnet lessens very rapidly both because the residual magnetism is decreasing and even more because of the decrease in the effectiveness of the magnetism as the armature recedes, while the moving force of the spring remains nearly constant. As a result the full movement of the armature and brake shoe is caused very quickly at accelerating speed after the magnetism has decreased to a point where the movement can start. Consequently the brake is applied with a heavy thud. Moreover, it is very suddenly applied with full holding force, so that the elevator car is stopped with a jerk if it is moving before the application of the brake. In practice, the opening of the brake switch has been calculated to result in applying the brake as nearly as feasible at the time when dynamic braking has stopped the car, in order to avoid as far as possible the objectionable jerk caused by the sudden application of the brake.

When spring 30 is employed, it will be seen that the armature is started by the springs away from the magnet while the magnetism still retains around five-sixths of its maximum force, and the moving force of spring 30 decreases somewhat faster than the effectiveness of the magnetism decreases because of the increasing distance of the armature. As a result the outward movement of the armature occurs at a rate substantially similar to the rate of decrease of magnetism until nearly the full extension of spring 30 has taken place, at which point there may be a slight dwell before spring 24 alone can produce further movement. Spring 30 is adjusted, in the example discussed above, so that this slight dwell occurs just as the brake begins to exert braking force.

It will be seen that, as a result of spring 30, the armature starts on its brake-applying movement more quickly after the current is cut off from the magnet, and moves outward at a rate governed by the decreasing magnetism until the brake shoe is actually in contact with the drum. In this way, there is no thud when the brake is applied, either when the shoe first contacts the drum or when final holding force is applied. Also the brake becomes effective much more quickly, as it is already exerting breaking force before the magnetism has decreased to a point that would permit the armature to start outward in the absence of spring 30. An additional feature is the gradual application of the brake, as the shoe is eased into light contact with the drum and then the contacting force is gradually increased, instead of the shoe being suddenly slammed against the drum with maximum holding force.

As a result of these interactions, the use of spring 30 or its equivalent eliminates all noticeable thud in both releasing and setting the brake, and applies the brake more promptly after the brake switch is opened, and stops a moving car without the objectionable jerk caused by the brake without spring 30 or its equivalent. This is especially advantageous in bringing a car to floor level by automatic leveling means. In practice it has made possible automatic leveling with a much greater degree of accuracy than was found practicable with brakes of the older type.

In the diagram shown in Fig. 2, there is a switch 41 which is closed to energize coil 32. The leads to coil 32 are connected to each other through a resistance 42, the amount of resistance controlling the rate at which the magnetism decreases after switch 41 is opened, as will be readily understood. Therefore the speed of application of the brake after switch 41 is opened may be increased by increasing resistance 42, or vice versa.

Since the use of spring 30 makes possible the easing of the brake shoe into final position instead of slamming it home with full force, it is found feasible to increase the force of spring 24 and make the brake hold more securely. In the example shown, a spring 24 exerting a force of around 1,000 lbs. is cited. In similar brakes without spring 30, a spring 24 having a force of 500 lbs. or 600 lbs. has been used, in order to lessen the objectionable slamming of the brakes as much as possible consistent with sufficient holding power.

The silent, smooth, swift and secure action of the brake produced by spring 30 is obtained without sacrificing any of the desirable qualities of the brake as formerly used, since it leaves spring 24 substantially in its original form, though permissibly strengthened. This spring is sufficiently long so that it applies the brake, without adjustment and with substantialy constant force, although the lining of the brake shoe may wear away to a considerable extent.

The invention has been shown in detail as applied to one particular type of magnetic brake. It will be readily understood that with other arrangements of braking mechanism, the auxiliary spring or its equivalent may be applied in different ways so as to obtain the desired results. The proper application of the spring can be designed with the diagram of Fig. 3 in mind, so that the resistance of the spring substantially balances the increase of attraction of the magnet as the armature approaches the magnet, particularly through the last portion of the travel of the armature towards the magnet. Therefore the scope of this invention is not confined to the particular example shown, but covers equivalents within the scope of the appended claims.

What I claim as new and desire to secure by Letters Patent is:

1. In combination, a brake, an electro magnet and armature therefor for releasing the brake, means constantly tending to set the brake and with approximately constant force, and auxiliary means urging the brake towards set position with increasing force as the armature approaches the magnet.

2. Apparatus in accordance with claim 1 and in which the force of said auxiliary means substantially equals the increase of attraction of the energized magnet as the armature approaches the magnet.

3. In combination, a brake, a brake setting element reciprocable to set and release the brake, an electro magnet operable to draw said element to its brake releasing position, a spring constantly urging said element in brake setting direction, and an auxiliary spring acting against said element with a force rapidly increasing as the element approaches brake releasing position.

4. Apparatus in accordance with claim 3 and in which said auxiliary spring is shorter and stronger than the first said spring.

5. Apparatus in accordance with claim 3 and in which said auxiliary spring is shorter and stronger than the first said spring and is positioned to be fully expanded before the brake is fully set and to be slightly compresesd before the brake is fully released.

6. In combination, a brake comprising a drum and a shoe, a lever carrying the shoe, an electro magnet drawing said lever to brake-releasing position when energized, a coil spring constantly compressed by said lever and urging the lever towards brake setting position, and a relatively short, strong coil spring concentric with the first said spring, fully expanded when the brake is fully applied, and partly compressed before the brake is completely released.

ERNEST B. THURSTON.